(12) United States Patent
Ricci et al.

(10) Patent No.: US 6,990,878 B2
(45) Date of Patent: Jan. 31, 2006

(54) RADIAL FEED FACING HEAD FOR BORING BAR

(75) Inventors: Donato L. Ricci, W8477 - 162$^{nd}$ Ave., Hager City, WI (US) 54017; Martin A. Gardzinski, Red Wing, MN (US)

(73) Assignee: Donato L. Ricci, Hager City, WI (US)

( * ) Notice: Subject to any disclaimer, the term of this patent is extended or adjusted under 35 U.S.C. 154(b) by 0 days.

(21) Appl. No.: 10/758,627

(22) Filed: Jan. 15, 2004

(65) Prior Publication Data

US 2005/0155471 A1 Jul. 21, 2005

(51) Int. Cl.
*B23B 3/00* (2006.01)
(52) U.S. Cl. .......................................... 82/123; 82/113
(58) Field of Classification Search ............. 408/72 R, 408/102, 124, 129; 82/123, 113, 148, 1.11, 82/1.2, 1.4, 59, 70.2
See application file for complete search history.

(56) References Cited

U.S. PATENT DOCUMENTS

| | | | |
|---|---|---|---|
| 4,573,837 A * | 3/1986 | Flaten | 408/111 |
| 4,652,186 A | 3/1987 | Sverdin | |
| 4,656,898 A * | 4/1987 | Hunt et al. | 82/128 |
| 4,668,133 A * | 5/1987 | Campbell et al. | 408/81 |
| 4,932,814 A | 6/1990 | York | |
| 5,030,041 A * | 7/1991 | Marron | 408/83.5 |
| 5,642,969 A * | 7/1997 | Strait | 408/124 |
| 6,447,220 B1 * | 9/2002 | Ricci et al. | 408/72 R |
| 6,705,185 B2 * | 3/2004 | Bruggemann | 82/82 |

* cited by examiner

*Primary Examiner*—Willmon Fridie, Jr.
(74) *Attorney, Agent, or Firm*—Thomas J. Nikolai; Nikolai & Mersereau, P.A.

(57) ABSTRACT

A portable boring/facing machine using a single drive motor for rotating a boring bar and for either axially translating a cutting head assembly along the bar or radially moving the blade of the cutting head assembly using a lead screw. The machine utilizing two mounting brackets is attachable to the workpiece for alignment with the workpiece.

10 Claims, 4 Drawing Sheets

RADIAL FEED FACING HEAD FOR BORING BAR

BACKGROUND OF THE INVENTION

I. Field of the Invention

This invention relates generally to metal working machines, and more particularly to a portable boring bar assembly with a radial feed head that can be used to rebore cylindrical apertures and/or to reface flange surfaces such as may be found on valves and other pipe or casing fittings in the field.

II. Discussion of the Prior Art

Portable boring bars are well known in the art. They generally consist of an elongated, cylindrical bar having a tool bit mounted thereon where the cylindrical bar is journaled for rotation in a frame attachable to the workpiece. A first drive member rotates the bar and a second drive member provides axial feed to the bar and the first drive member. This general construction can be recognized in several patents including the York U.S. Pat. No. 4,932,814, the Flaten U.S. Pat. No. 4,573,837 and the Sverdlin U.S. Pat. No. 4,652,186.

For example, in the York '814 patent, there is described an arrangement in which a cylindrical boring bar is journaled for rotation in a pair of supports and is adapted to translate the boring bar and its rotary drive motor assembly. A boring tool is mounted along the length of the boring bar and projects radially there from for engaging the wall of a cylindrical bore to be refurbished.

The Ricci et al. U.S. Pat. No. 6,447,220 B1 improved upon these by providing a much more facile machine where the mechanism for rotating the boring bar as well as the drive for translating the cutting head can be adjustably positioned anywhere along the length of the boring bar. While this was a remarkable improvement in terms of adjustability, simplification of alignment, available torque, radial displacement, and feed rate control, this design still required two separate and distinct drive members to accomplish radial and axial movement of the cutting head.

The present invention is advantageous over the prior art due to new concepts included in its simplified and scaled-back design. Some differences include a single drive member operating a feed screw that runs down the bore bar enabling both radial and axial feed of the head as well as an improved facing head design. The head has an actuating shaft that allows it to stop and feed radially using the same feed screw used for axial feed. Because this design creates an effective tool that can be adjusted radially and axially using a single drive member, there is a substantial increase in efficiency and reduction in the required cost.

SUMMARY OF THE INVENTION

The present invention provides for a boring/facing machine comprising an elongated, generally cylindrical, rigid boring bar member that is journaled for rotation in a pair of spaced-apart mounting brackets attachable to the workpiece to be refurbished. The boring bar supports a cutting head member thereon which rotates with the boring bar when the drive motor is activated and is capable of providing axial (longitudinal) translation of the cutting head member. Additionally, the axial translation may be stopped and radial movement of the cutting tool may be used for facing operations of flange surfaces instead.

Either axial translation along the length of the boring bar or radial movement of the cutting head is achieved by using a lead screw powered by the feeder motor. The lead screw is journaled for rotation within a channel or groove in the surface of the boring bar. The lead screw carries a traveling nut that engages the cutting head member and causes axial translation or radial movement.

These and other objects, features and advantages of the present invention will become readily apparent to those skilled in the art through a review of the following detailed description in conjunction with the claims and accompanying drawings in which like numerals in several views refer to the same corresponding parts.

DESCRIPTION OF THE PREFERRED EMBODIMENT

The present invention represents broadly applicable improvements for portable bore bar assembly designed to rebore cylindrical apertures and to reface flange surfaces. The embodiments herein are intended to be taken as representative of those in which the invention may be incorporated and are not intended to be limiting.

Figure 1:
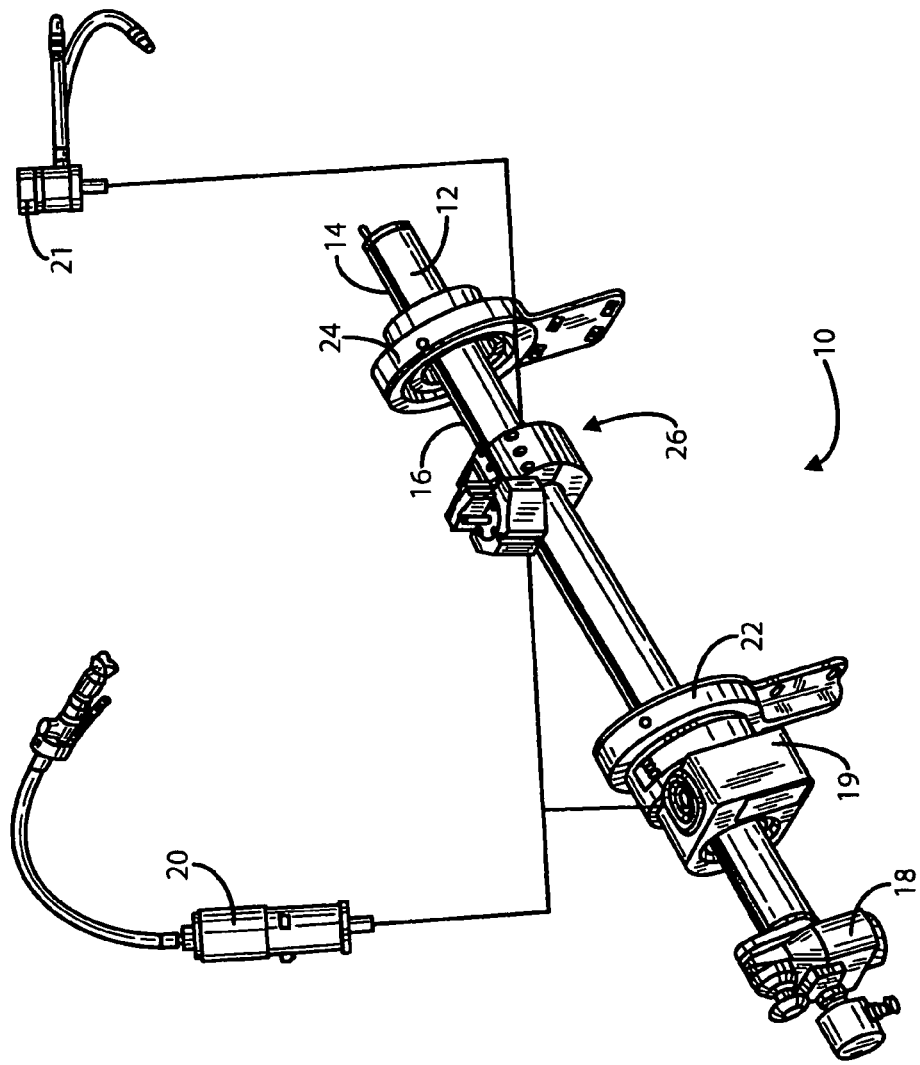
FIG. 1 is an isometric view of the boring bar of the present invention.

Referring first to FIG. 1, there is shown an isometric view of a bore bar assembly on which the radial feed facing head is mounted. The assembly itself is indicated generally by numeral 10 and includes an elongated, generally cylindrical, hardened steel bar member 12 that has a longitudinal groove 14 formed inwardly from a peripheral surface thereof. The groove extends the entire length of the bar member 12. Contained within the groove 14 is a threaded lead screw 16 that is journaled for rotation within that groove. It is driven by a feed motor 18 that is shown as being affixed to the left end of the bore bar member 12 in FIG. 1. Disposed about the bar member 12 and affixed to the mounting bracket 22 is a boring bar drive housing 19 which contains a gear transmission for rotationally coupling, either air motor, as at 20, or a hydraulic motor, as at 21, or an electric motor (not shown) to the drive housing 19 to effect the rotation of bar member 12 about its longitudinal axis. The feed motor 18 rotates with the bar member 12.

The bore bar member 12 is journaled for rotation in a pair of parallel, spaced-apart swivel mount brackets 22 and 24 that are adapted for attachment, either directly or indirectly, to a workpiece to be refurbished. Slidingly disposed about the boring bar member 12 is the radial feed facing head assembly 26. This assembly is operatively coupled to the lead screw 16 as to travel longitudinally along bar member 12 as the lead screw 16 is driven.

Figure 2:
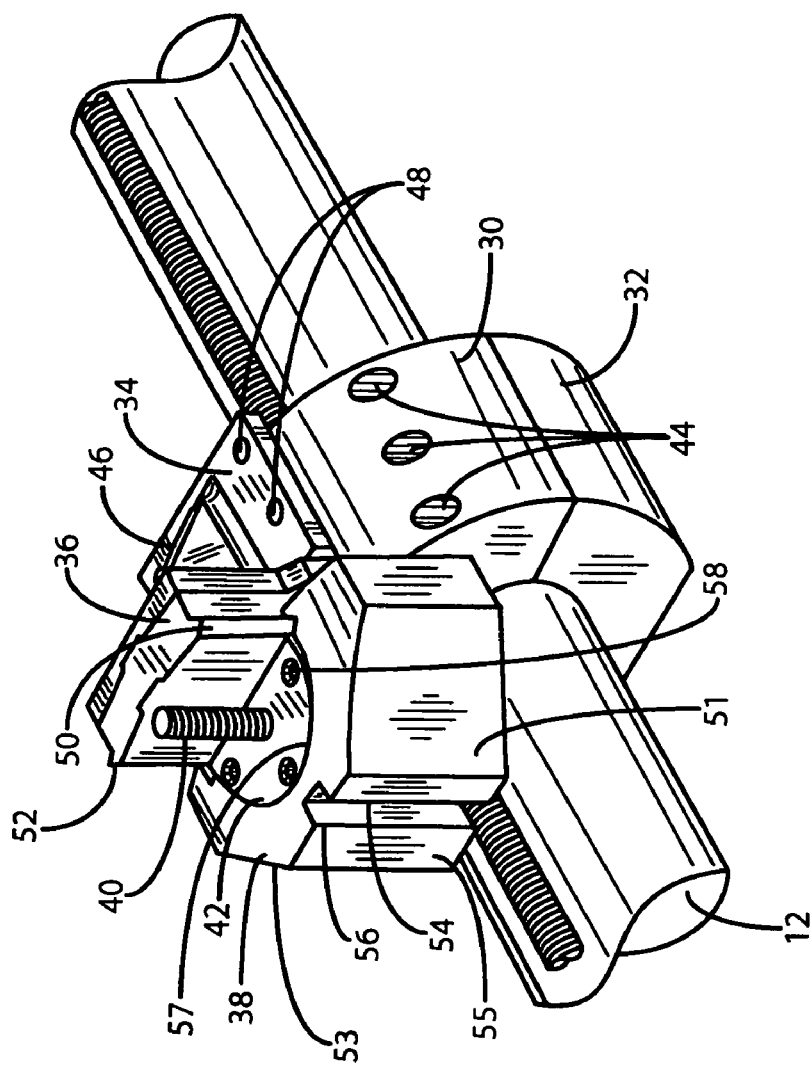
FIG. 2 is an isometric view of the bore bar facing head of the present invention.

With reference to FIG. 2, the radial feed facing head assembly 26 can be seen in greater detail. It is made up of two part radial covers 30 and 32, angle bracket 34, slide bracket 36, tool holder 38, radial feed screw 40, and screw feed nut 42. Radial covers 30 and 32 fit together to form a somewhat cylindrical casing around the internal gears and shaft components of the radial feed facing head assembly 26. The two cover pieces are affixed together using bolts in a row of holes 44 on each side of the bar member 12. Angle bracket 34 is generally a L-shaped piece of metal which sits atop the top radial cover 30. The angle bracket 34 is reinforced down its center by a triangular shaped wedge 46. Holes 48 for attachment to the top radial cover 30 and slide bracket 36 are located at the corners of the bottom and vertical faces of the angle bracket 34.

Slide bracket 36 is a largely rectangular block that abuts up against the vertical portion of the angle bracket 34 and the side of the radial cover 30. The bottom of this rectangular block has a number of mounting holes as well as an opening through which some of the inner gears extend. (See FIG. 4.) On the sides of the slide bracket 36 are triangular-shaped gibs 50 and 52 which protrude slightly outward. The gibs 50 and 52 guide the tool holder 38 as it moves up and down.

Tool holder 38 is a somewhat U-shaped block that slides up and down gibs 50 and 52. It has beveled corners 51 and 53 leading to a generally flat surface 55. Formed longitudinally in the surface 55 is a vertical slot 54 lined with holes 56, in which a cutting tool (not shown) can be mounted for facing operations. Tool holder 38 has a center cavity 57 containing gears which drive feed screw 40 to move the tool holder 38 up and down. Surrounding the radial feed screw 40 and located in the inner cavity of tool holder 38 and the upper radial feed housing 41 (See FIG. 4) is screw feed nut 42. Screw feed nut 42 is simply a threaded plate with several bolt holes 58 for mounting it to the tool holder 38.

Figure 3:
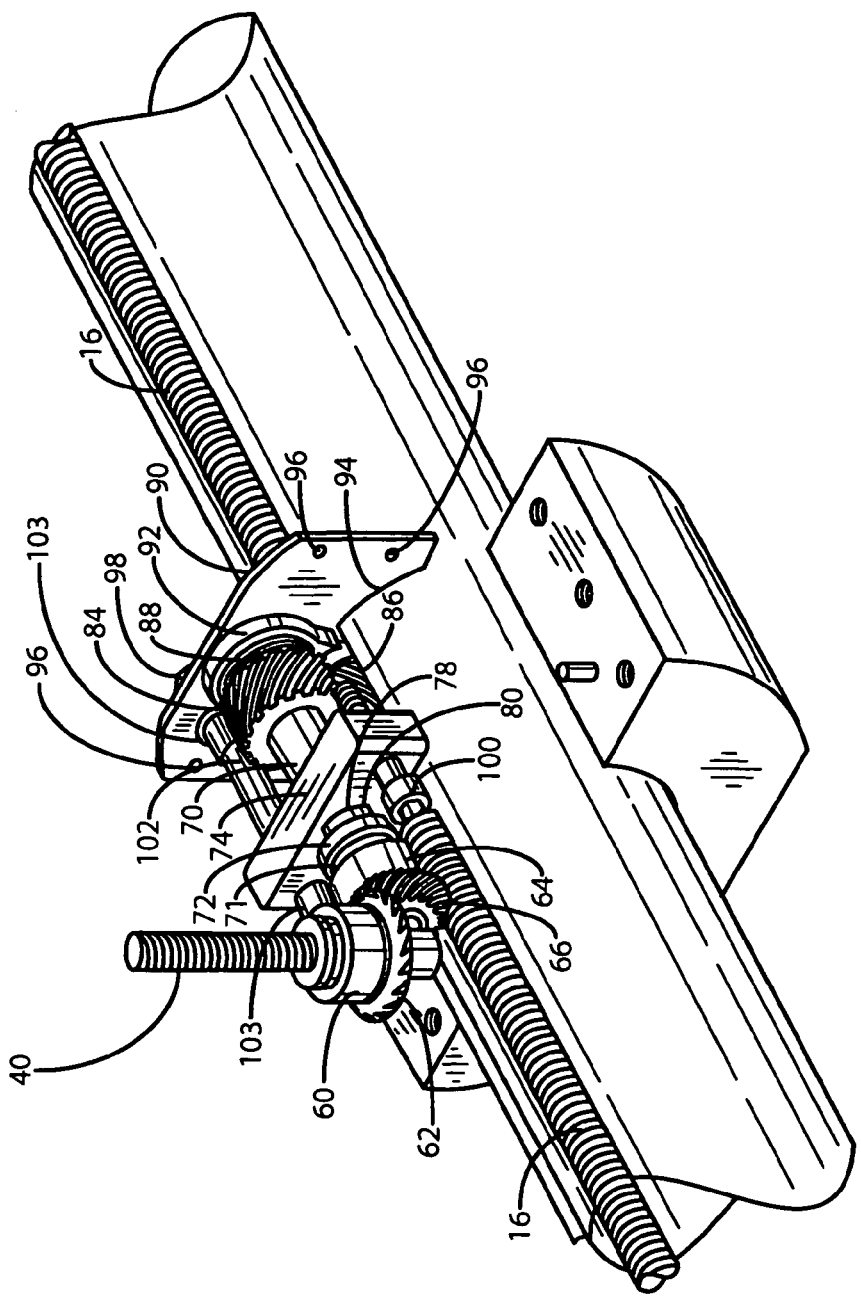
FIG. 3 is a isometric view of a partially assembled bore bar facing head of the present invention.

Referring now to FIG. 3, the radial feed facing head assembly 26 is shown with the top radial cover 30, angle bracket 34, slide bracket 36, tool holder 38, and screw feed nut 42 removed to show the internal gearing for axially translating the assembly 26 along the bore bar 12 or for radially displacing the facing head assembly 26.

Shown in FIG. 3 is the radial feed screw 40 that is responsible for directing the radial movement of a cutting tool performing a facing operation. The screw 40 projects perpendicularly to the bar member 12 and is threaded with a predetermined pitch. The inner end of radial feed screw 40 is set in a stationary block with a cylindrical and conical bore making up a lower feed housing 59. Within the lower feed housing 59, and surrounding the lower end of the radial feed screw 40, is a bronze feed-screw bushing 63. Feed-screw 40 has a square key 61 midway up its inner length (see FIG. 4) that is received in a correspondingly shaped bore in a spiral miter gear 60. Spiral miter gear 60 includes gear teeth 62. These gear teeth 62 are angled so as to mesh with the gear teeth 66 of an output gear 64. Output gear 64 and spiral miter gear 60 are oriented perpendicular to one another and are capable of converting a rotation about a horizontal axis into one which is vertically, radially directed. The output gear 64 is mounted axially on an adapter 69 (See FIG. 4) on the end of a radial feed shaft 70. It is the condition of the radial feed shaft 70 that determines whether the assembly carrying the tool bit will move axially along the boring bar 12 or will move radially relative to the boring bar.

Radial feed shaft 70 is surrounded by a number of components that are largely cylindrical and aligned axially. Moving down the shaft 70 from output gear 64, there is a thrust bushing 71, followed by a bearing 72 for journaling the shaft 70 in the radial cover member 30. The next component, moving to the right along the shaft 70, is a rectangular block referred to as nut 74. This nut is in the shape of a rectangular block except that the bottom face of the block is slightly sloped, and rests upon the sloped top of axial feed stop 76. (See FIG. 4.) Nut 74 has a bore 78 through which shaft 70 passes. This bore is lined by tapered collar 80 that is then keyed to a snap ring cone 75 (See FIG. 4) surrounding shaft 70. Next to the right on shaft 70 is a spur gear 84. Spur gear 84 engages with spur gear 86. This interaction is largely responsible for transferring rotational power from the threaded lead screw 16 to the radial feed shaft 70. Beyond gear 84 is a bushing 88 (See FIG. 4.) and bearing 89 which are supported by an end plate 90 in its circular flange 92 in which shaft 70 terminates. The plate 90 has a curved bottom 94 which abuts up against the outer circumference of the bar member 12. Holes 96 in the corners of plate 90 allow for attachment to the top radial cover 30.

FIG. 3 also shows a shaft 102 that is placed in spaced apart, parallel relation to shaft 70. This shaft 102 is located within a bore extending through the radial cover 30. (not shown) The shaft 102 rotates around bushings 103, located near each of its ends. The shaft 102 is also threaded around its perimeter for axial travel along nut 74. The final component on the end of shaft 102 is a end hex nut 98. (See FIG. 4.) This nut 98 is located on a short portion of shaft 102 that juts through end plate 90 and outside the radial cover 30. This nut 98 allows an operator to turn feed control shaft 102 using a box wrench or similar tool. Rotation of this nut results in engaging or disengaging the nut 74 with respect to the axial feed stop 76 or conversely engaging or disengaging nut 74 with respect to cone 80.

Also shown in FIG. 3 is a shoulder bolt 100. This component runs through nut 74 and fastens into radial cover 30 providing further stability to the assembly. The unthreaded portions of the shoulder bolt facilitate sliding movement of the nut 74 therealong when the shaft 102 is manually turned.

Figure 4:
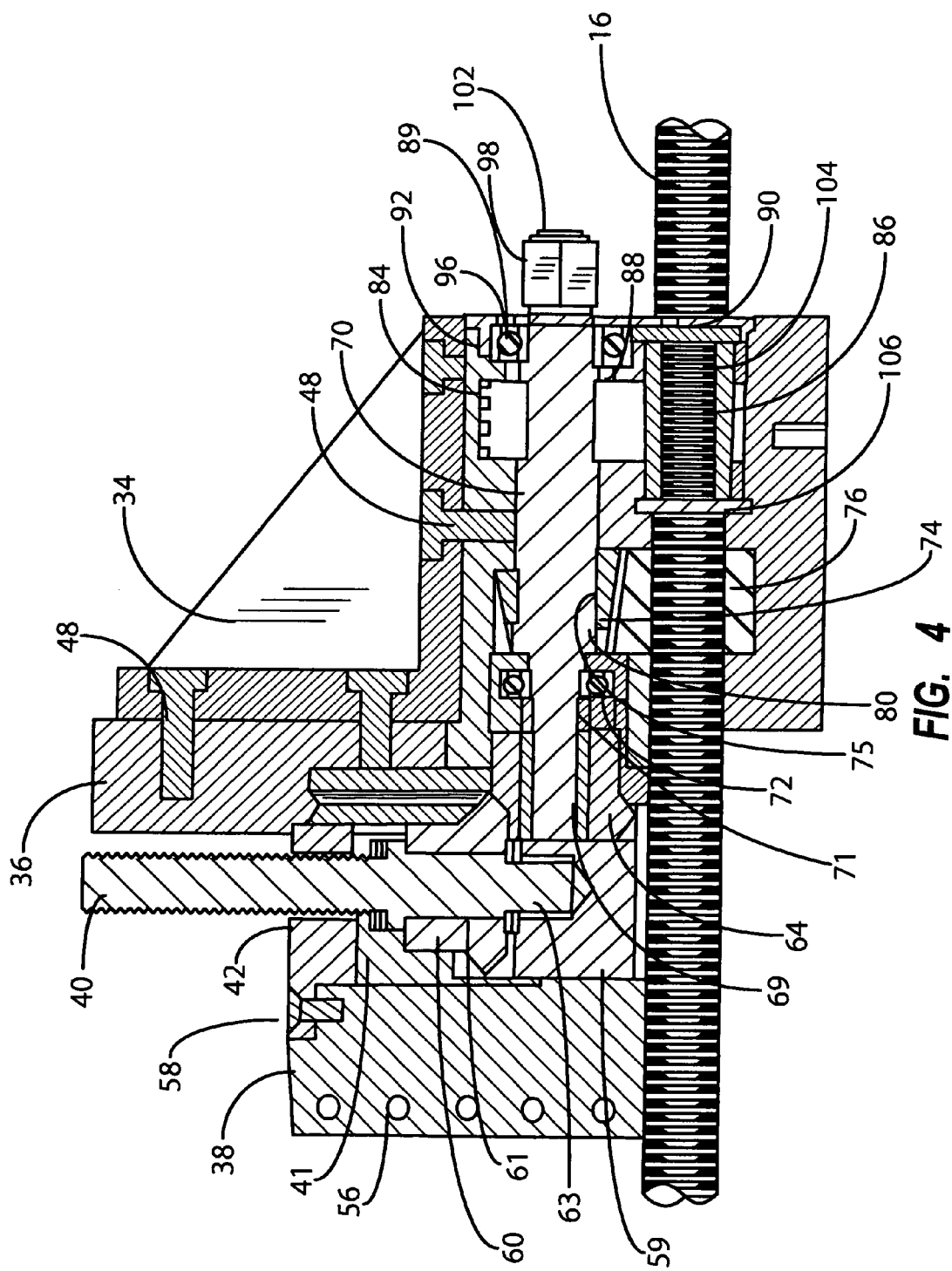
FIG. 4 is a cross-sectional side view of the bore bar facing head of the present invention.

FIG. 4 shows a side cross-section of the assembly where the remaining elements are disclosed. These include parts contained along the threaded lead screw 16, such as axial feed stop 76. The axial feed stop 76 is a somewhat rectangular block having a bore through which the threaded lead-screw 16 passes. The top face of the block is slightly sloped for engagement with the slanted bottom face of nut 74. Axial feed stop 76 moves a small amount up or down based upon the position of nut 74 on the feed control shaft 102. Also contained along the threaded lead screw 16 is the helical gear 86. Helical gear 86 has a hex shaped inside profile that rides on an internally threaded, externally hexed adapter. The outside of gear 86 has teeth that mesh with those of gear 84. Surrounding gear 86 are needle bearings 104 on both of its sides which ride on bushings 106 to each side. Underneath the threads of the gear 84 is a threaded hex adapter 108. This hex adapter 108 fits to the hex shaped inside profile of gear 86. These comprise the components that allow for transfer of axial rotation of screw 16 to radial translation.

Further shown in FIG. 4 are the angle bracket 34, slide bracket 36, tool holder 38, feed screw 40, and feed nut 42. This figure discloses locations where bolts are used to secure these pieces together, such as at bolt-holes 48, 58, 96, etc. The holes 56 shown in the tool holder 38 represent the location where the tool blade would be mounted which would perform the facing operations.

Now that the details of the mechanical construction of radial feed facing head of the present invention have been described, consideration will next be given to its mode of operation. The present invention is capable of operating in both a mode of operation in which the feed facing head assembly 26 undergoes axial translation along the bar member 12 and a mode of operation in which the facing tool of the feed facing head assembly 26 moves in a radial direction. Both of these operations can be depicted and explained by primarily looking to FIG. 4.

When an axial translation operation is desired, the machine is first put in position and mounted within a work piece using the two swivel mount brackets 22 and 24. Next, the operator must turn end nut 98 so that the feed control shaft 102 causes the nut 74 to move to the right in FIG. 4, i.e., toward the gears 84 and 86. When the nut 74 travels in this direction, it engages the tapered collar 80 on the shaft 70 and prevents the shaft 70 from rotating. The operator starts the motor 18, which causes axial rotation of threaded lead screw 16. This causes the radial feed facing head assembly 26 to travel axially along the threaded lead screw 16 based on the rotating interaction between the lead screw 16 and the threaded hex adapter 108 driving the inner diameter of gear 86.

When a facing operation is desired requiring radial movement of the facing tool of the feed facing head assembly 26, the machine is positioned in the workpiece using the swivel mount brackets 22 and 24, as before. Next, the operator, using a wrench, turns the feed control shaft 102 in a direction such that nut 74 moves to the left, away from the gears 84 and 86. When the nut 74 travels in this direction, it pushes the axial feed stop 76 down so that it engages with the keyway and prevents axial feed. With the axial feed stop 76 so engaged, the gear train is free to rotate the radial feed head 26. Generally, the feed-motor 18 is turned on by the operator and that causes threaded lead screw 16 to rotate. This, in turn, causes gear 86 to rotate, which then causes gear 84 to rotate. Shaft 70 and, accordingly, output gear 64 are also turned, causing screw drive gear 60 and radial feed screw 40 to turn. Finally, the rotation of feed screw 40 causes tool holder 38 (carrying a tool not shown) to move up or down the slide bracket 36 depending on the direction of rotation of the lead screw 16, providing the desired overall radial movement of the tool. The bar member 12, additionally, will be rotated about its longitudinal axis within the swivel mount brackets 22 and 24 in either of these two modes of operation discussed. This is accomplished, as in the Ricci et al. U.S. Pat. No. 6,447,220, by the drive means made up of the boring bar drive housing 19 and either an air motor 20 or a hydraulic motor 21. Therefore, the axial translation mode will result in a boring operation of a surrounding tubular workpiece. The axial movement of the cutting blade combined with the rotation of bar member 12 allows the inside diameter of the work piece being bored away and smoothed. The radial movement of the facing tool will result in a facing operation, which will slowly smooth the faces of flange surfaces the tool's blade comes into contact with.

It can be seen, then, that the present invention provides an improved, versatile, efficient portable boring and facing machine. The result is that there is a more simple and scaled-back machine.

This invention has been defined herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself

The invention claimed is:

1. A metal working machine for reboring or refacing a workpiece comprising, in combination:
    (a) an elongated, boring bar member;
    (b) first and second mounting brackets attachable to the workpiece at longitudinally spaced locations therealong, each said mounting bracket including bearings in which the boring bar member is journaled for rotation;
    (c) an annular cutting head member disposed about the boring bar member and rotatable therewith, the annular cutting head member having a slide supporting a tool bit that is adapted to be moved in a radial direction with respect to the boring bar member's longitudinal axis;
    (d) a first drive means adapted to be coupled to the boring bar member for rotating the boring bar member and the cutting head member about the longitudinal axis of the boring bar member;
    (e) a second drive means including an elongated lead screw coupled to said cutting head member for longitudinally translating the cutting head member axially along the boring bar member; and
    (f) a control device operatively coupled to the elongated lead screw, the control device having a manually adjustable control shaft which when turned in a first direction inhibits axial movement of the cutting head member and imparts radial displacement to the slide and tool bit.

2. The metal working machine of claim 1 wherein the first drive means includes one of an electrical motor, a hydraulic motor and an air motor.

3. The metal working machine of claim 1 further including a plurality of set screws extending radially through the first and second mounting brackets for locking the machine in place on said workpiece.

4. The metal working machine of claim 1 wherein the boring bar member includes a longitudinal groove formed inwardly of a peripheral surface thereof.

5. The metal working machine of claim 4 wherein said elongated lead screw is disposed in the longitudinal groove and journaled for rotation therein.

6. The metal working machine as in claim 1 wherein the second drive means includes:
    (a) a threaded nut on the elongated lead screw and cooperating with the annular cutting head member and adapted to displace the annular cutting head member along the longitudinal axis of the boring bar member;
    (b) a second lead screw journaled for rotation in the cutting head member about an axis that is perpendicular to the longitudinal axis of the cylindrical boring bar member; and
    (c) a threaded nut on the second lead screw and cooperating with said slide and adapted to displace the slide in a radial direction dependent on the direction of rotation of the elongated lead screw when said control shaft is turned in the first direction.

7. The metal working machine as in claim 6 and further including a manually shiftable gear mechanism operatively coupled between the elongated lead screw and the second lead screw and to the control shaft for selectively driving the second lead screw while stopping displacement of the cutting head member along the longitudinal axis of the cylindrical boring bar member or stopping displacement of the slide while displacing the cutting head member along the longitudinal axis of the cylindrical boring bar member.

8. The metal working machine as in claim 7 wherein the shiftable gear mechanism comprises:
    (a) said control shaft mounted in the annular cutting head member, said control shaft having a threaded segment;
    (b) a stop nut having a tapered edge surface, a tapered bore and a threaded bore, the threaded bore engaging the threaded segment on the control shaft whereby rotation of this control shaft translates the stop nut;
    (c) an idler shaft having a tapered collar keyed thereto, the tapered collar being inserted through the tapered bore in the stop nut, the idler shaft further having first and second gears mounted thereon and affixed thereto, the first gear cooperating with the gear formed on the threaded nut on said elongated lead screw and the second gear cooperating with a further gear affixed to the second lead screw; and (c) an axial feed stop member having a tapered surface adapted to engage with said tapered edge surface of the stop nut when the control shaft is turned in a first direction and to disengage from said tapered surface of the stop nut when the control shaft is turned in a direction opposite said first direction.

9. A metal working machine for reboring or refacing a workpiece, comprising, in combination:
   (a) an elongated boring bar journaled for rotation about a longitudinal axis between longitudinally spaced mounting brackets, the boring bar having an annular cutting head mounted thereon, the annular cutting head supporting a tool slide; and
   (b) first drive means coupled to the boring bar for rotating the boring bar about the longitudinal axis; and
   (c) second drive means including a control shaft that arrests longitudinal movement of the cutting head and initiates radial movement to the tool slide when the control shaft is rotated in a first direction and arrests radial movement of the tool slide and initiates longitudinal movement of the cutting head when the control shaft is rotated in a direction opposite the first direction.

10. The metal working machine as in claim 9 wherein the control shaft is disposed in the annular cutting head and includes a threaded segment with a stop nut having a threaded bore for engaging the threaded segment whereby clockwise rotation of the control shaft displaces the stop nut in a first direction and counterclockwise rotation of the control shaft displaces the stop nut in a second direction opposite to the first direction.

* * * * *